(12) United States Patent
Pedrini

(10) Patent No.: US 10,053,022 B2
(45) Date of Patent: Aug. 21, 2018

(54) BICYCLE-CARRYING DEVICE FOR MOTOR-VEHICLES

(71) Applicant: Fabio Pedrini, Bologna (IT)

(72) Inventor: Fabio Pedrini, Bologna (IT)

( * ) Notice: Subject to any disclaimer, the term of this patent is extended or adjusted under 35 U.S.C. 154(b) by 171 days.

(21) Appl. No.: 14/921,172

(22) Filed: Oct. 23, 2015

(65) Prior Publication Data
US 2016/0185304 A1 Jun. 30, 2016

(30) Foreign Application Priority Data

Dec. 24, 2014 (IT) .............................. TO2014A1103

(51) Int. Cl.
*B60R 9/10* (2006.01)
*B60R 9/06* (2006.01)
*B60R 11/00* (2006.01)

(52) U.S. Cl.
CPC ................. *B60R 9/10* (2013.01); *B60R 9/06* (2013.01); *B60R 2011/004* (2013.01); *B60R 2011/0059* (2013.01)

(58) Field of Classification Search
CPC ................ B60R 9/08; B60R 9/10; B60R 9/06
USPC .......................... 224/924, 523, 532, 536, 493
See application file for complete search history.

(56) References Cited

U.S. PATENT DOCUMENTS

| | | | |
|---|---|---|---|
| 1,496,466 A | 6/1924 | Hinge | |
| 2,555,473 A | 6/1951 | Deaton | |
| 2,742,261 A | 4/1956 | Arnold | |
| 2,833,453 A | 5/1958 | Barreca | |
| 3,464,608 A | 9/1969 | Rodriguez | |
| 3,655,082 A | 4/1972 | Garrett | |
| 3,659,762 A | 5/1972 | Kravitz | |
| 3,675,833 A | 7/1972 | Barr | |
| 3,695,469 A | 10/1972 | Arant | |
| 3,710,999 A | 1/1973 | Allen | |

(Continued)

FOREIGN PATENT DOCUMENTS

| | | |
|---|---|---|
| CN | 103786654 | 5/2014 |
| CN | 203651640 | 6/2014 |

(Continued)

OTHER PUBLICATIONS

GB1522656.6 Search Report dated Apr. 14, 2016, 2 pages.
TO20141103 Italian Search Report dated Sep. 18, 2015, 8 pages.

*Primary Examiner* — Nathan J Newhouse
*Assistant Examiner* — Phillip Schmidt
(74) *Attorney, Agent, or Firm* — Boyle Fredrickson, S.C.

(57) ABSTRACT

A bicycle-carrying device for motor-vehicles comprises a support structure defining a main axis, and a plurality of legs carried by the support structure for abutment on the rear part of a motor-vehicle. At least some of said legs are orientable around said main axis. The device further comprises a plurality of arms carried by the support structure for supporting one or more bicycles, and a plurality of belts or cables associated with the bicycle-carrying device and each having a book member for engagement on the rear part of the motor-vehicle, for anchoring said bicycle-carrying device to the motor-vehicle. At least some of said legs have each a respective roll-up device for winding a belt or cable around a respective winding axis. Each roll-up device is arranged within an inner cavity of the respective leg with the winding axis located at a position spaced apart from said main axis.

16 Claims, 16 Drawing Sheets

(56) References Cited

U.S. PATENT DOCUMENTS

| | | |
|---|---|---|
| 3,720,333 A | 3/1973 | Vaughn |
| 3,754,672 A | 8/1973 | Blomquist |
| 3,805,325 A | 4/1974 | Lee |
| 3,837,513 A | 9/1974 | Adamek |
| 3,877,622 A | 4/1975 | McLain |
| 3,891,132 A | 6/1975 | Chandler |
| 3,912,139 A | 10/1975 | Bowman |
| 3,994,425 A | 11/1976 | Graber |
| 4,046,297 A | 9/1977 | Bland |
| 4,085,874 A | 4/1978 | Graber |
| RE29,840 E | 11/1978 | Wasserman |
| 4,298,151 A | 11/1981 | O'Connor |
| 4,301,956 A | 11/1981 | Hoerner |
| 4,378,883 A | 4/1983 | Profeta |
| 4,394,948 A | 7/1983 | Graber |
| 4,428,516 A | 1/1984 | Allen |
| 4,452,385 A | 6/1984 | Prosen |
| 4,513,897 A | 4/1985 | Graber |
| 4,598,889 A | 7/1986 | Remington |
| 4,603,452 A | 8/1986 | Paciorek |
| 4,646,952 A | 3/1987 | Timmers |
| 4,676,413 A | 6/1987 | Began et al. |
| 4,709,840 A | 12/1987 | Allen |
| 4,726,499 A | 2/1988 | Hoerner |
| 4,804,120 A | 2/1989 | Kraklio |
| 4,815,638 A | 3/1989 | Hutyra |
| 4,830,250 A | 5/1989 | Newbold et al. |
| 4,856,686 A | 8/1989 | Workentine |
| 4,863,080 A | 9/1989 | Graber |
| 4,875,608 A | 10/1989 | Graber |
| D306,992 S | 4/1990 | Morehouse |
| 4,976,386 A | 12/1990 | Geiger |
| 4,997,116 A | 3/1991 | Grim |
| 5,067,641 A | 11/1991 | Johnson et al. |
| 5,118,020 A | 6/1992 | Piretti |
| 5,121,862 A | 6/1992 | Schmidt |
| 5,129,559 A | 7/1992 | Holliday |
| D329,035 S | 9/1992 | Blackburn et al. |
| 5,181,822 A | 1/1993 | Allsop et al. |
| 5,195,670 A * | 3/1993 | Piretti ............... B60R 9/06 16/324 |
| 5,211,323 A | 5/1993 | Chimenti et al. |
| 5,259,542 A | 11/1993 | Newbold et al. |
| 5,269,446 A | 12/1993 | Biehn |
| 5,303,857 A | 4/1994 | Hewson |
| 5,305,936 A | 4/1994 | Nusbaum |
| 5,377,885 A | 1/1995 | Wyers |
| 5,377,886 A | 1/1995 | Sickler |
| 5,385,280 A | 1/1995 | Littlepage et al. |
| 5,435,475 A | 7/1995 | Hudson et al. |
| 5,455,987 A | 10/1995 | Svehaug |
| 5,495,970 A * | 3/1996 | Pedrini ............... B60R 9/06 211/17 |
| 5,573,165 A | 11/1996 | Bloemer et al. |
| 5,647,521 A | 7/1997 | Burgess |
| 5,664,717 A | 9/1997 | Joder |
| 5,690,260 A | 11/1997 | Aikins et al. |
| 5,699,985 A | 12/1997 | Vogel |
| 5,702,040 A | 12/1997 | Hedeen |
| 5,735,410 A | 4/1998 | Kallstrom |
| 5,826,767 A | 10/1998 | Chimenti |
| 5,862,966 A | 1/1999 | Mehls |
| 5,871,131 A | 2/1999 | Low et al. |
| 5,938,093 A | 8/1999 | Bloemer et al. |
| 5,971,241 A | 10/1999 | Allen et al. |
| 5,996,870 A | 12/1999 | Shaver |
| 6,006,973 A | 12/1999 | Belinky et al. |
| 6,007,053 A | 12/1999 | Huang |
| 6,019,266 A | 2/2000 | Johnson |
| 6,089,430 A | 7/2000 | Mehls |
| 6,092,706 A | 7/2000 | Bogan |
| D430,533 S | 9/2000 | Peschmann |
| 6,126,188 A | 10/2000 | Volodarsky |
| 6,129,371 A | 10/2000 | Powell |
| 6,199,735 B1 | 3/2001 | Cothern et al. |
| D447,997 S | 9/2001 | Ferman et al. |
| 6,283,349 B1 | 9/2001 | Morris |
| 6,336,580 B1 | 1/2002 | Allen et al. |
| 6,345,748 B1 | 2/2002 | Chimenti et al. |
| 6,422,442 B1 | 7/2002 | Erickson |
| 6,431,423 B1 | 8/2002 | Allen et al. |
| D467,219 S | 12/2002 | Peschmann |
| 6,616,023 B1 | 9/2003 | Dahl et al. |
| 6,698,723 B1 | 3/2004 | Antonini |
| 6,988,645 B1 | 1/2006 | Nusbaum et al. |
| 7,213,731 B1 | 5/2007 | Kolda |
| 7,866,517 B2 | 1/2011 | Pedrini |
| 8,028,878 B1 | 10/2011 | Pedrini |
| 8,444,032 B2 | 5/2013 | Pedrini |
| 8,684,244 B2 | 4/2014 | Pedrini |
| 8,733,605 B2 | 5/2014 | Pedrini |
| 2001/0030216 A1 | 10/2001 | Johnson |
| 2001/0035446 A1 | 11/2001 | Walstrom et al. |
| 2002/0047031 A1 | 4/2002 | Ferman |
| 2002/0096546 A1 | 7/2002 | Bogoslofski |
| 2002/0117524 A1* | 8/2002 | Jeong ............... B60R 9/06 224/314 |
| 2004/0039635 A1 | 5/2004 | Pedrini |
| 2004/0084558 A1* | 5/2004 | Huang ............... B60P 7/0846 242/385.4 |
| 2006/0032879 A1 | 2/2006 | Settelmayer |
| 2006/0138186 A1* | 6/2006 | Pedrini ............... B60R 9/06 224/497 |
| 2007/0235487 A1 | 10/2007 | Bogoslofski |
| 2007/0251964 A1 | 11/2007 | Gunn |
| 2008/0093404 A1 | 4/2008 | Clausen |
| 2008/0190979 A1 | 8/2008 | Robins |
| 2009/0120986 A1 | 5/2009 | Sauter |
| 2009/0279978 A1* | 11/2009 | Polin, Jr. ............... B65D 63/16 410/100 |
| 2010/0181357 A1* | 7/2010 | Christianson ............ B60R 9/06 224/497 |
| 2011/0068138 A1* | 3/2011 | Flaherty ............... B60R 9/06 224/324 |
| 2012/0298707 A1* | 11/2012 | Sautter ............... B60R 9/06 224/502 |
| 2013/0327801 A1 | 12/2013 | Prescott et al. |

FOREIGN PATENT DOCUMENTS

| | | |
|---|---|---|
| FR | 2902725 | 12/2007 |
| WO | 2011038042 | 3/2011 |

* cited by examiner

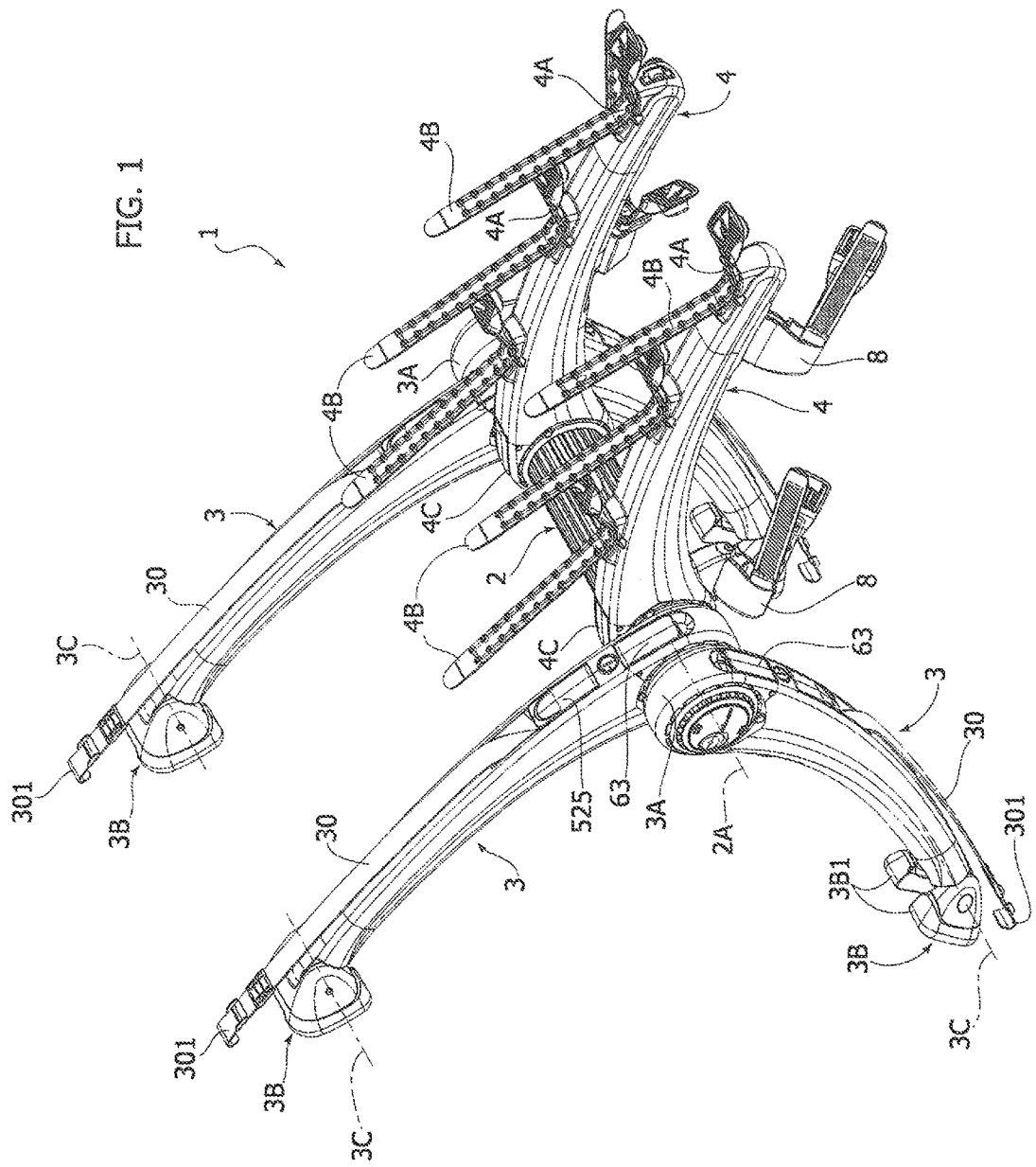

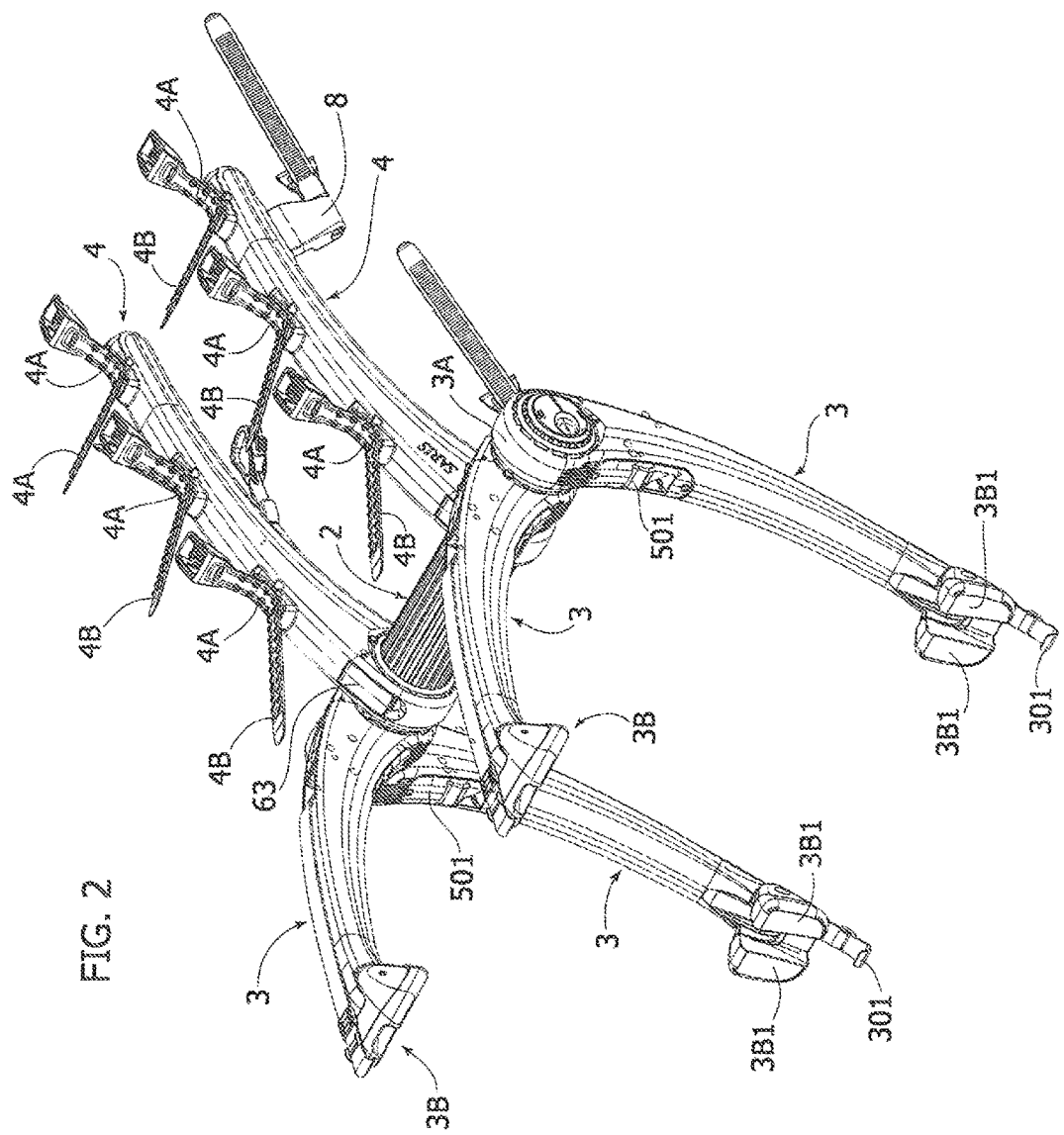

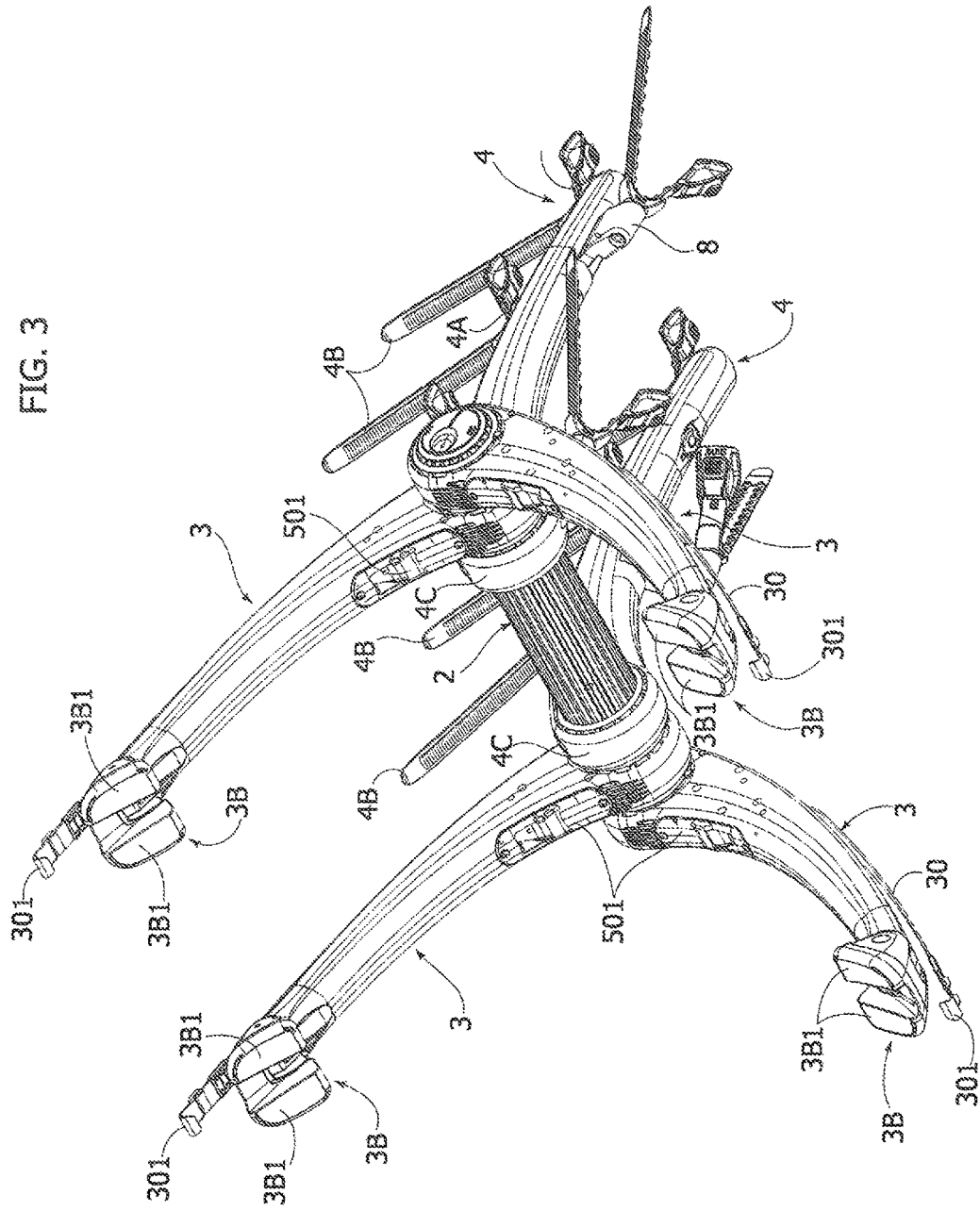

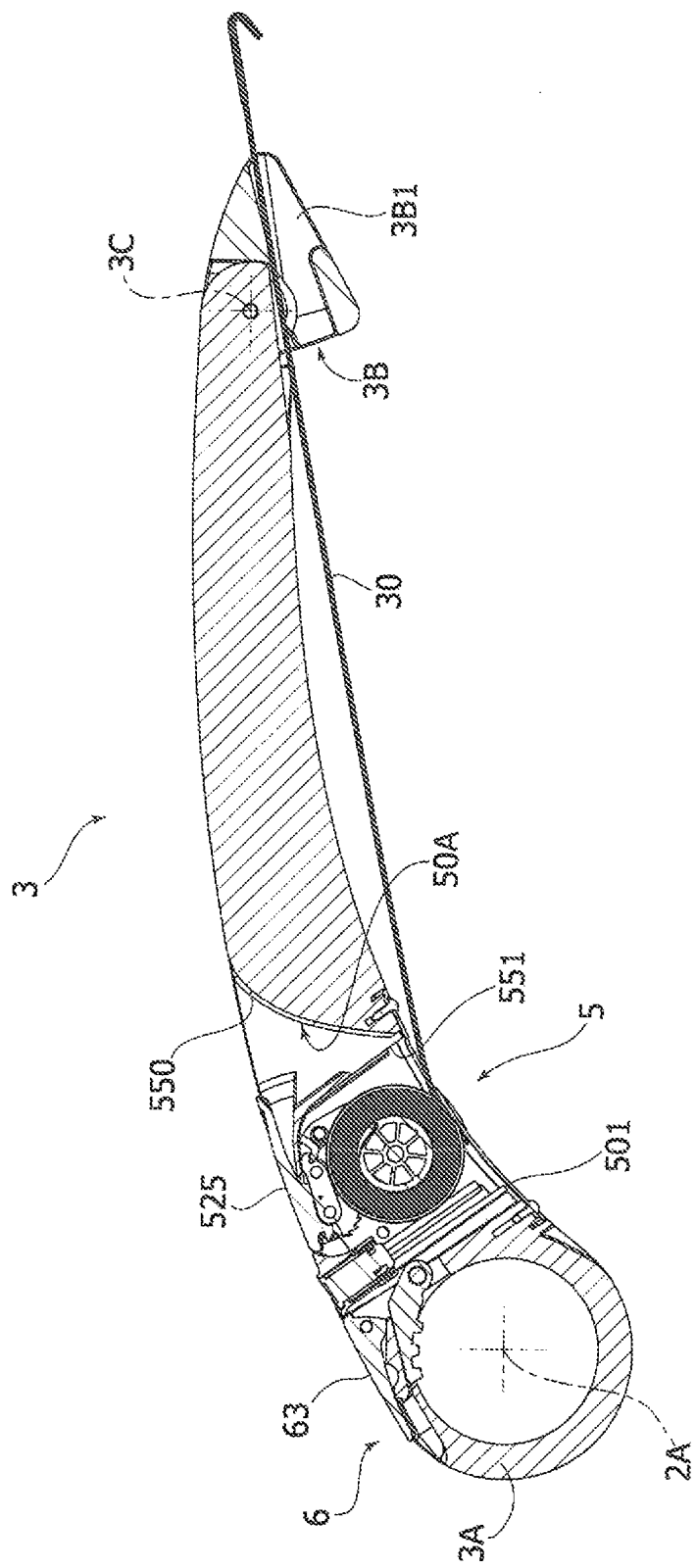

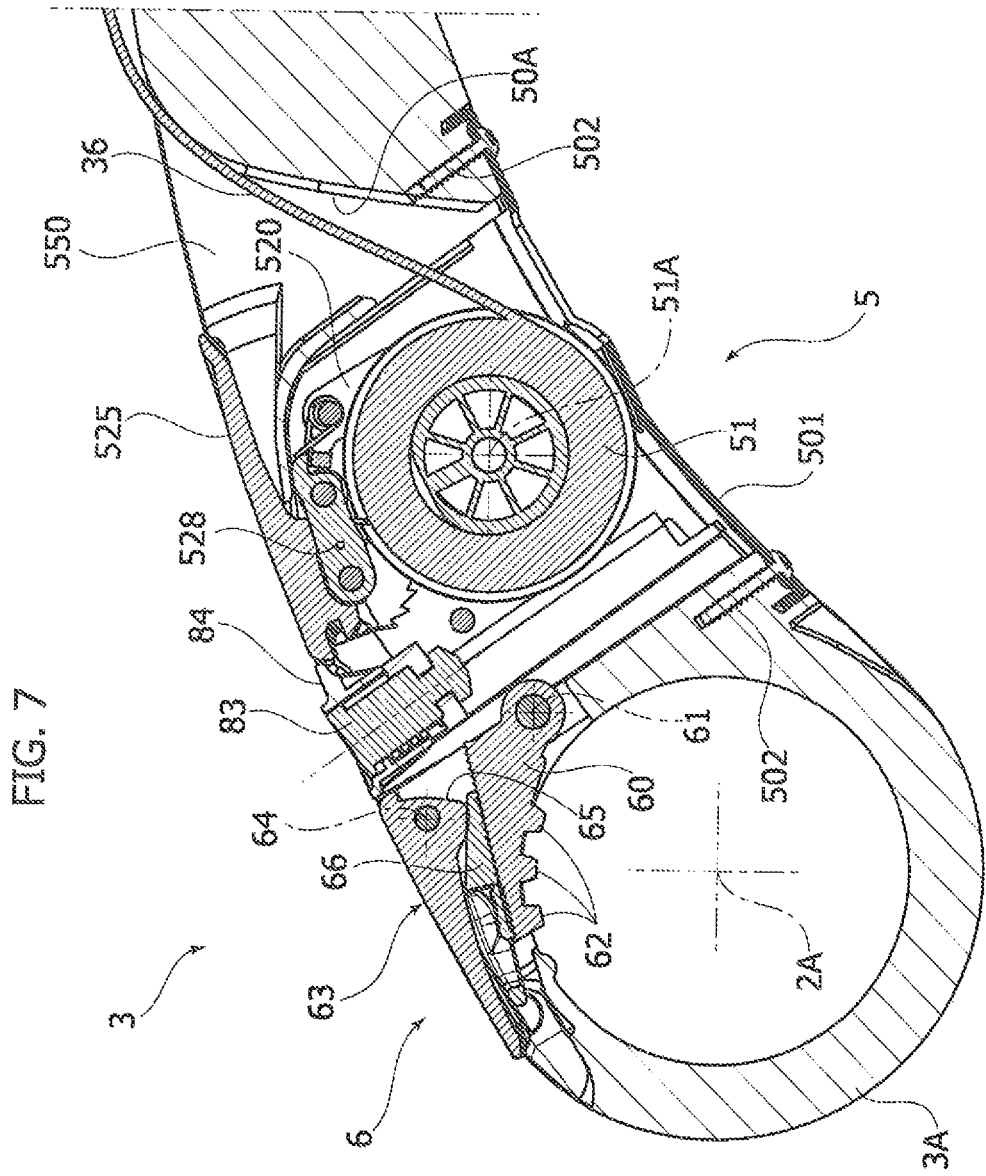

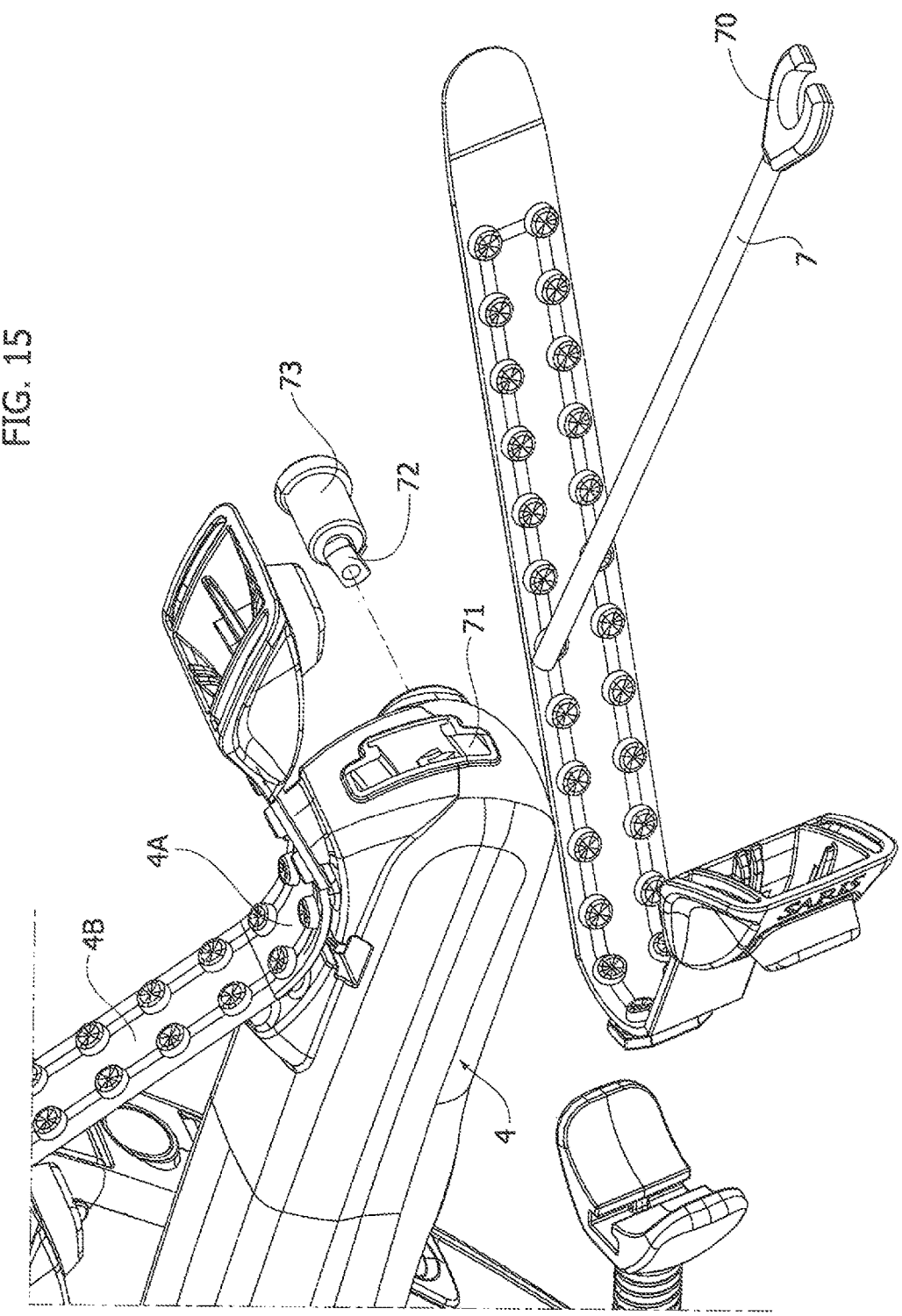

BICYCLE-CARRYING DEVICE FOR MOTOR-VEHICLES

BACKGROUND AND SUMMARY

Field of the Invention

The present invention relates to bicycle-carrying devices for motor-vehicles, in particular of the type comprising:
- a support structure,
- a plurality of legs carried by the support structure for abutment on the rear part of a motor-vehicle,
- a plurality of arms carried by the support structure for supporting one or more bicycles, and
- a plurality of belts or cables associated with the bicycle-carrying device and each having a hook member for engagement on a motor-vehicle part, for anchoring said bicycle-carrying device to the motor-vehicle.

In the field of bicycle-carrying devices of the type indicated above, a solution conceived by the same inventor, which was disclosed in EP 0 671 295 A1 and U.S. Pat. No. 5,495,970, has been marketed by the U.S. company SARIS under the trademark "Bones" and has found widespread success. In this known solution, the above mentioned support structure comprises a shaft whose axis defines the above mentioned main axis. The above mentioned legs and arms each have a hub mounted on a respective portion of this shaft.

Document WO 2011/038042 A1 discloses a bicycle-carrying device of the above described type, which is provided with roll-up devices arranged at the ends of the shaft carrying the legs and arms, for winding the anchoring cables around a winding axis coincident with the axis of the shaft. In this arrangement the roll-up devices cannot be associated with the legs, since the hubs of at least some of the legs are occupied by clamping devices for clamping each hub on the support shaft.

Object of the Invention

The object of the present invention is that of providing a bicycle-carrying device of the above indicated type in which:
- the operations for mounting the device on the motor-vehicle and for dismantling the device from the motor-vehicle are extremely simple, easy and quick,
- a high stability is obtained of the bicycle-carrying device during travel of the motor-vehicle, also along the direction transverse to the median vertical plane of the motor-vehicle,
- the device has an extremely simple and functional structure and is adapted to assume a configuration of minimum bulk when it is not used,
- a high safety is obtained against a non-authorized removal of the bicycle-carrying device from the motor-vehicle,
- it is possible for the device to be reconfigured as a function of the shape of the motor-vehicle on which it must be mounted, by simple and quick operations,
- the roll-up devices are arranged so that they can be used easily, while also enabling a quick retraction once the device has been removed from the motor-vehicle.

SUMMARY OF THE INVENTION

In view of achieving these and further objects, the invention provides a bicycle-carrying device for motor-vehicles comprising:
- a support structure, defining a main axis,
- a plurality of legs carried by the support structure for abutment on the rear part of a motor-vehicle, at least some of said legs being orientable around said main axis,
- a plurality of arms carried by the support structure, for supporting one or more bicycles,
- a plurality of belts or cables associated with the bicycle-carrying device and each having a hook member for engagement on a motor-vehicle part, for anchoring said bicycle-carrying device on the motor-vehicle,
- in which said bicycle-carrying device comprises one or more roll-up devices for winding said belts or cables around respective winding axes,
- characterized in that at least some of said legs each have a respective roll-up device arranged within an inner cavity of the leg, and having a winding axis located at a position spaced apart from said main axis.

Due to these features, each anchoring belt or cable can be stored inside a respective leg of the bicycle-carrying device. At the same time, since each roll-up device is arranged at a position spaced apart from said main axis, it does not interfere with the leg portion which is mounted on said support structure. As a consequence, if this is desired, it is possible to provide all of said legs of the bicycle-carrying device with respective roll-up devices.

Thus, according to a preferred solution, all said legs have respective roll-up devices each arranged within an inner cavity of the respective leg, with the winding axis located at a position spaced apart from said main axis.

One exemplary application which is particularly preferred is that in which said support structure comprises a shaft whose axis defines said main axis and said legs and said arms each have a hub mounted on a respective portion of said shaft. In this case, each roll-up device is arranged within an inner cavity of a respective leg, at a position spaced apart from the respective hub.

Preferably, all the said legs have a roll-up device with an outlet for the respective belt or cable arranged so that the belt or cable pulled out from the roll-up device extends in line with the respective leg, substantially in a same plane orthogonal to said main axis.

In the preferred embodiment, each leg is provided with a foot for abutment on the motor-vehicle, having two foot portions which are spaced apart transversally from each other, so that in the mounted condition of said bicycle-carrying device on the motor-vehicle the foot of each leg can be arranged with its two portions on the two sides of the hook member carried by the belt or cable associated with said leg, so that once engaged on the motor-vehicle, said hook member prevents movements of the foot along the transverse direction.

Furthermore, preferably each roll-up device has two outlets located on two opposite faces of the respective leg and adapted to be selectively used for guiding the belt or cable pulled out from said roll-up device respectively adjacent to one or the other of said opposite faces.

According to a further feature, each roll-up device comprises:
- a support casing received within said cavity of the respective leg,
- a belt or cable winding reel, rotatably supported by said casing around said winding axis,
- at least one spring operatively interposed between the casing and the reel for biasing the reel in a direction for winding said belt or cable, and a ratchet mechanism including:
  at least one toothed crown associated with said reel,
  a pawl pivotally mounted on said casing and elastically biased into engagement with said at least one toothed crown, so as to prevent a rotation of the toothed crown in the direction for unwinding said belt or cable, while leaving the toothed crown free to rotate in the opposite direction,
  a tensioning member pivotally mounted on said casing and having an actuating lever and a toothed sector associated with the actuating lever and engaging said at least one toothed crown,
  said actuating lever being movable from a rest position to a first operative position or tensioning position, for rotating said toothed crown in the winding direction and causing a tensioning of said belt or cable after that the respective hook member has been engaged on the motor-vehicle,
  said actuating lever being also movable from the rest position to a second operative position or release position, located on the opposite side with respect to said first operative position, for causing disengagement of both said toothed sector and said pawl from said toothed crown.

The release position of said actuating lever can be used either for quickly rewinding the belt after that the device has been removed from the motor-vehicle, or for mounting the device on the motor-vehicle more easily, by first engaging the hook members of two belts on the motor-vehicle and then positioning the bicycle-carrying device in the most suitable way, by holding the levers of the two associated roll-up devices in the release position, so as to enable free unwinding of the belts.

Preferably, with each roll-up device there is associated a key-operated release-inhibition device, for inhibiting a movement of said actuating lever towards the release position.

According to a further feature, the hub of at least some of said legs and said arms is provided with a clamping device for clamping the hub in a selected mounting position over a portion of said shaft.

Preferably, said clamping device comprises:
  a jaw pivotally mounted on the hub of the respective arm or leg, for engagement of a portion of said shaft,
  a locking lever pivotally mounted on the respective leg or arm and carrying a cam member for pressing said jaw against said shaft,
  said locking lever being movable from a release position to a final locking position arranged beyond a dead centre position, so as to prevent an undesired return of the locking lever to the release position,
  a wedge-like intermediate member, interposed between the cooperating surfaces of said cam member and said jaw, said wedge-like intermediate member being adjustable in position, for adjusting the jaw clamping force.

In a preferred embodiment anchoring belts are provided which are each reinforced with a plurality of embedded steel cables.

Due to the above mentioned features, the bicycle-carrying device according to the invention is extremely simple and easy to use. As indicated, the operations for mounting the device on the motor-vehicle are greatly facilitated and simplified. The operation for removing the device from the motor-vehicle are also simple and quick and once the device has been removed from the motor-vehicle the anchoring belts can be stored quickly within the respective roll-up devices, by holding the actuating levers in their release positions.

The arrangement of the anchoring belts in lino with all the respective legs provides a high stability of the device during travel of the motor-vehicle, also with reference to undesired movements along the transverse direction.

BRIEF DESCRIPTION OF THE DRAWINGS

Further features and advantages of the invention will become readily apparent from the following description with reference to the annexed drawings, given purely by way of non-limiting example, in which:

FIG. 1 is a perspective view of a preferred embodiment of a bicycle-carrying device according to the present invention, FIG. 6A shows the cross-sectional view of FIG. 6 with the leg in a different condition of use, FIG. 7 is a view at an enlarged scale of a detail of FIG. 6, FIG. 15 is an exploded perspective view of a detail of an arm forming part of the bicycle-carrying device according to the invention, provided with an anti-theft device.

DETAILED DESCRIPTION

Figure 1A:
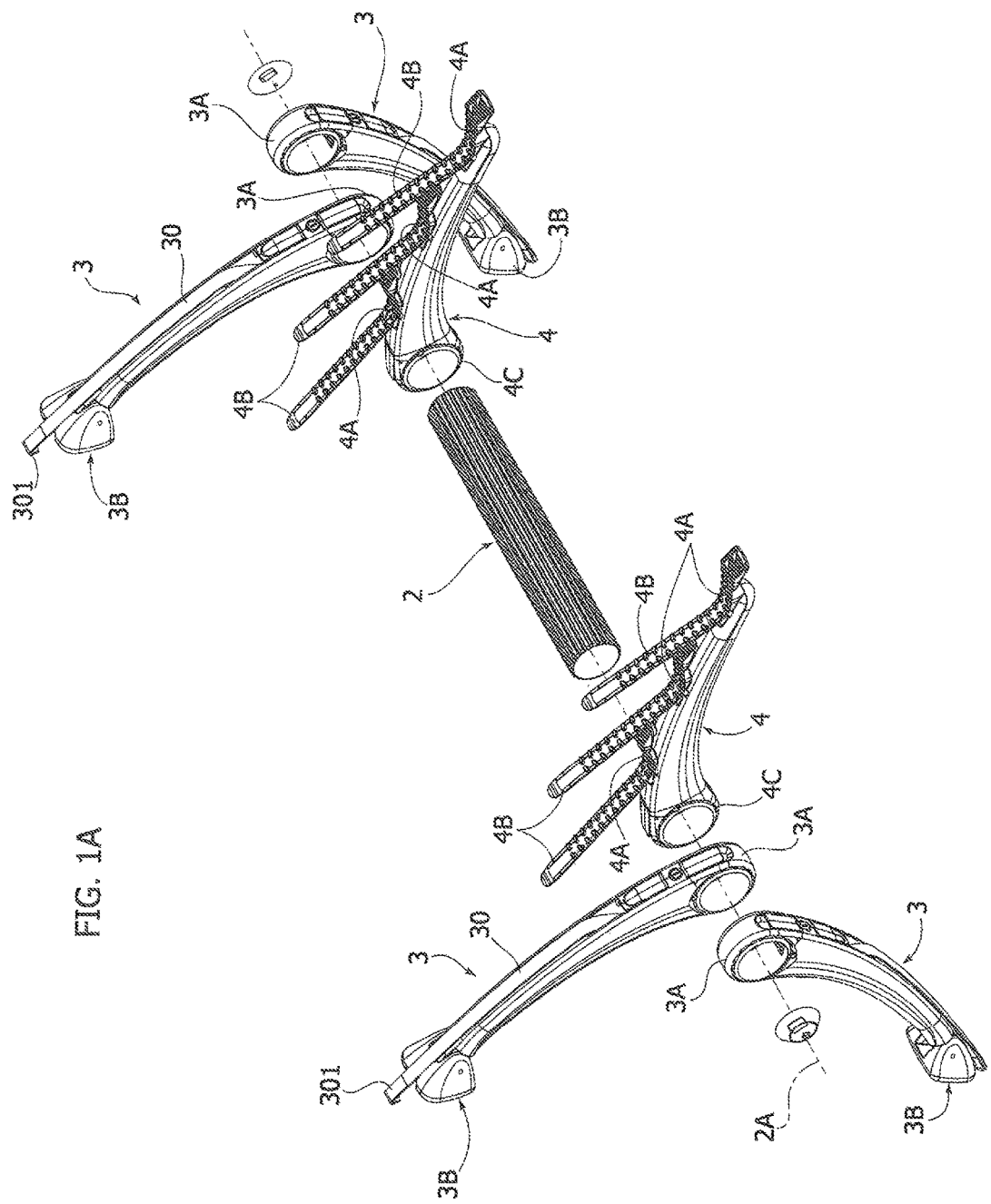
FIG. 1A is a perspective exploded view of the bicycle-carrying device of FIG. 1, FIGS. 2-4 are further perspective views of the bicycle-carrying device of FIG. 1.
Figure 4:
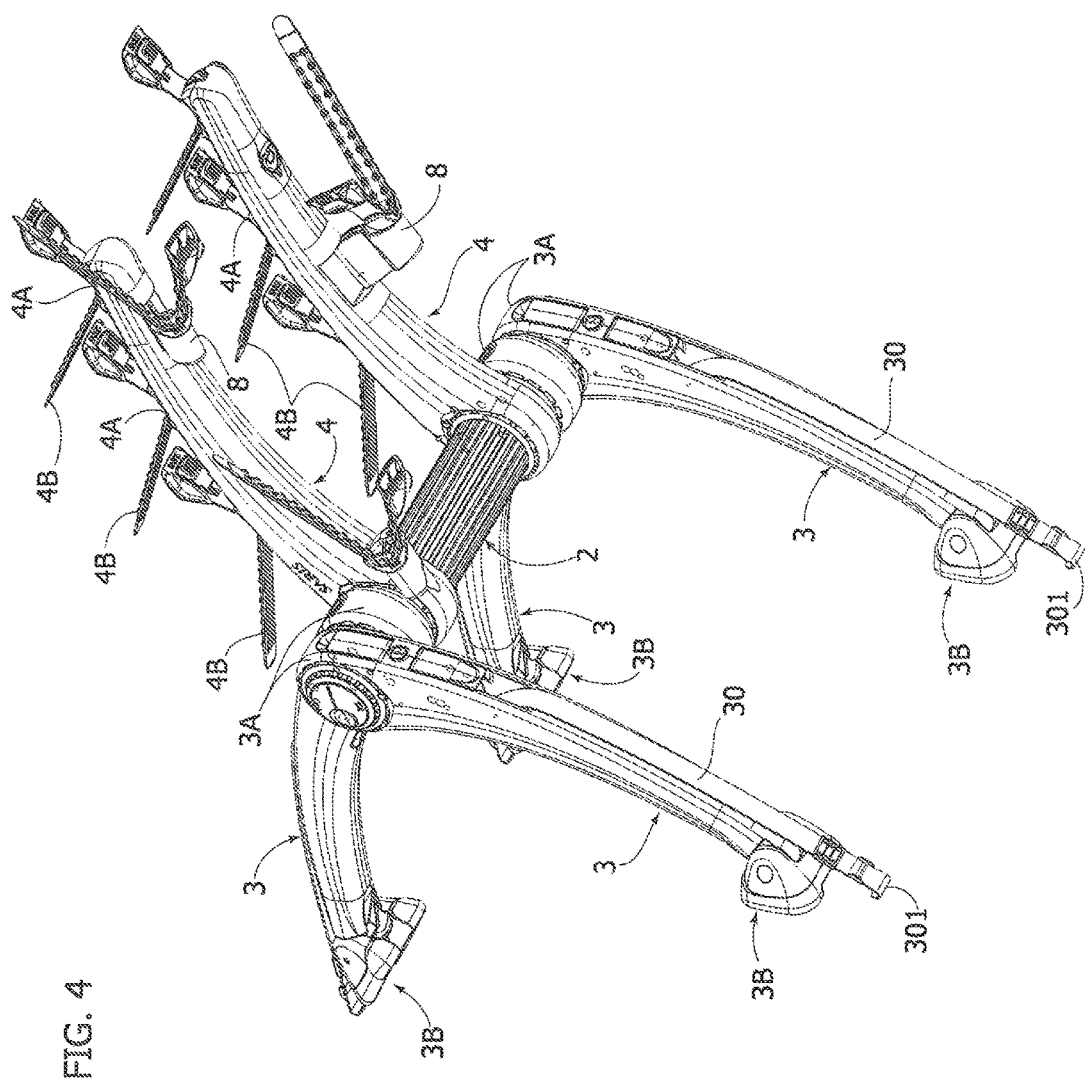
Figure 5:
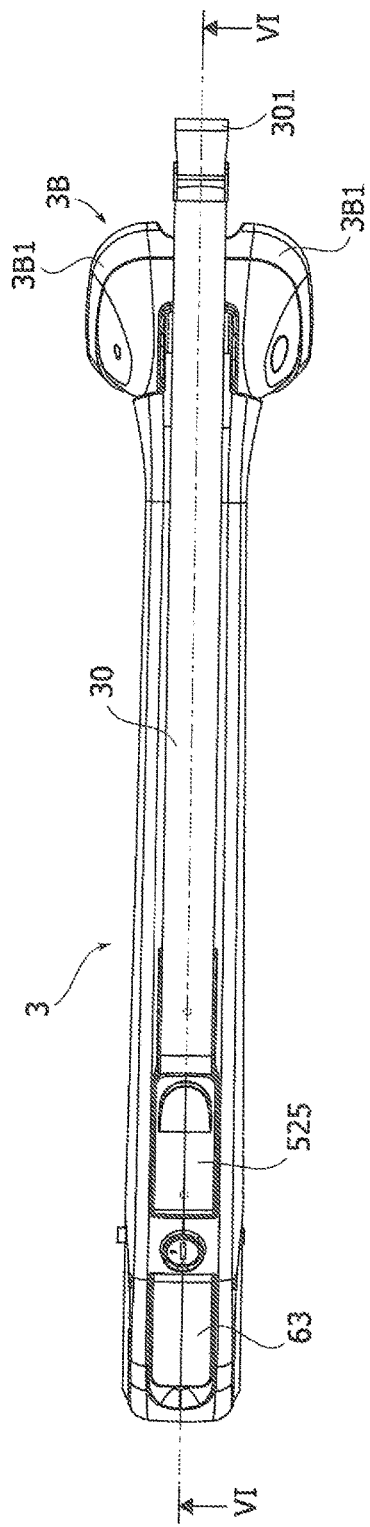
FIG. 5 is a plan view of a leg forming part of the bicycle-carrying device of FIG. 1.

In FIGS. 1-4, reference numeral 1 generally designates a preferred embodiment of a bicycle-carrying device according to the invention.

In this embodiment, the bicycle-carrying device 1 comprises a support structure constituted by a fluted shaft 2, for example having a tubular body made of aluminium, which in the mounted condition of the device 1 on the motor-vehicle is arranged with its axis 2A directed transversally, i.e. orthogonally to the median vertical plane of the motor-vehicle. On the fluted shaft 2 there are mounted the hubs 3A of two pairs of legs 3 each provided with an abutting foot 3B which is to abut against the rear part of a motor-vehicle. In the illustrated example, each foot 3B has a body pivotally mounted on the free end of the respective leg 3 around a transverse axis 3C and including two foot portions 3B1 which are spaced apart transversally from each other.

The bicycle-carrying device 1 further comprises a pair of arms 4 which are for supporting bicycles, in a way known per se, on a plurality of cradles 4A each provided with a flexible clamping belt 4B. Each arm 4 also has a hub 4C which is mounted and locked over the fluted shaft 2.

Anchoring belts 30 are associated with the four legs 3 which are provided with feet 3B for abutment on the rear part of the motor-vehicle, one belt being associated with each leg. Each belt 30 has one end provided with a hook member 301 which is to be engaged on the edge of a motor-vehicle part (such as the edge of the trunk or the rear door). On the opposite end, the anchoring belt 30 can be wound within a roll-up device 5 (FIG. 8) carried by a casing 50 mounted within an inner cavity 50A arranged within the body of the respective leg 3 (see for example FIG. 6) at a position spaced apart from axis 2A of hub 3A.

Figure 8:
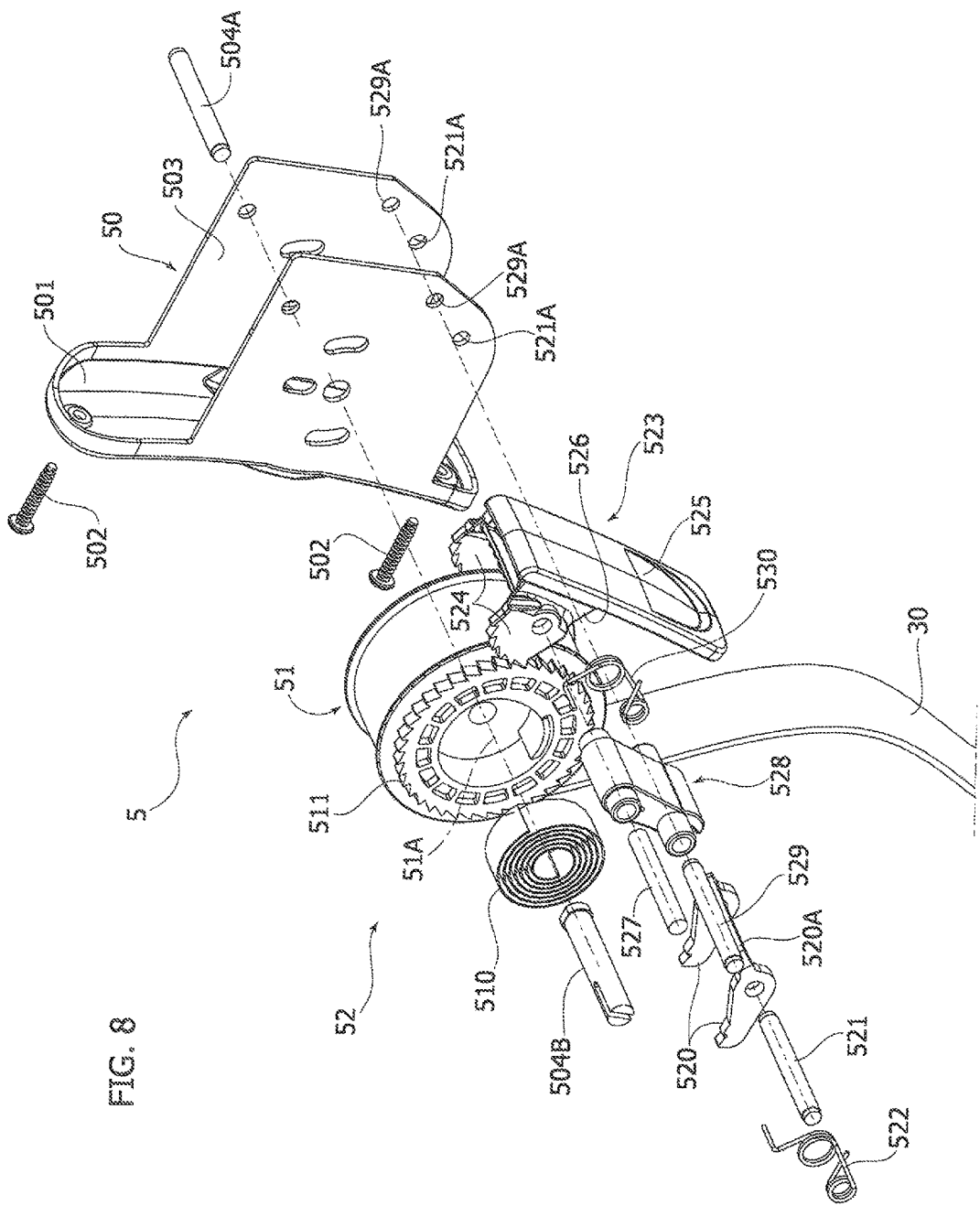
FIG. 8 is a perspective exploded view of a roll-up device forming part of the bicycle-carrying device according to the invention.

With reference to FIGS. 5-11, and in particular to FIG. 8, the support casing 50 of each roll-up device 5 has, in the case of the illustrated example, a base flange 501 provided with holes for engagement of connecting screws 502 which secure said flange on the outer surface of the respective leg 3 (see also FIG. 2). The casing 50 further comprises two parallel and spaced apart plates 503 between which there is arranged a support pin 504 constituted by two mutually engaged pin elements 504A,504B. Pin 504 rotatably supports a reel 51 around a winding axis 51A, for winding the respective anchoring belt 30. A flat spiral spring 510 is arranged within the reel 51 and is operatively interposed between said reel and the pin 504 which is secured to casing 50, for biasing the reel 51 in the direction for winding the belt 30.

Figure 9:
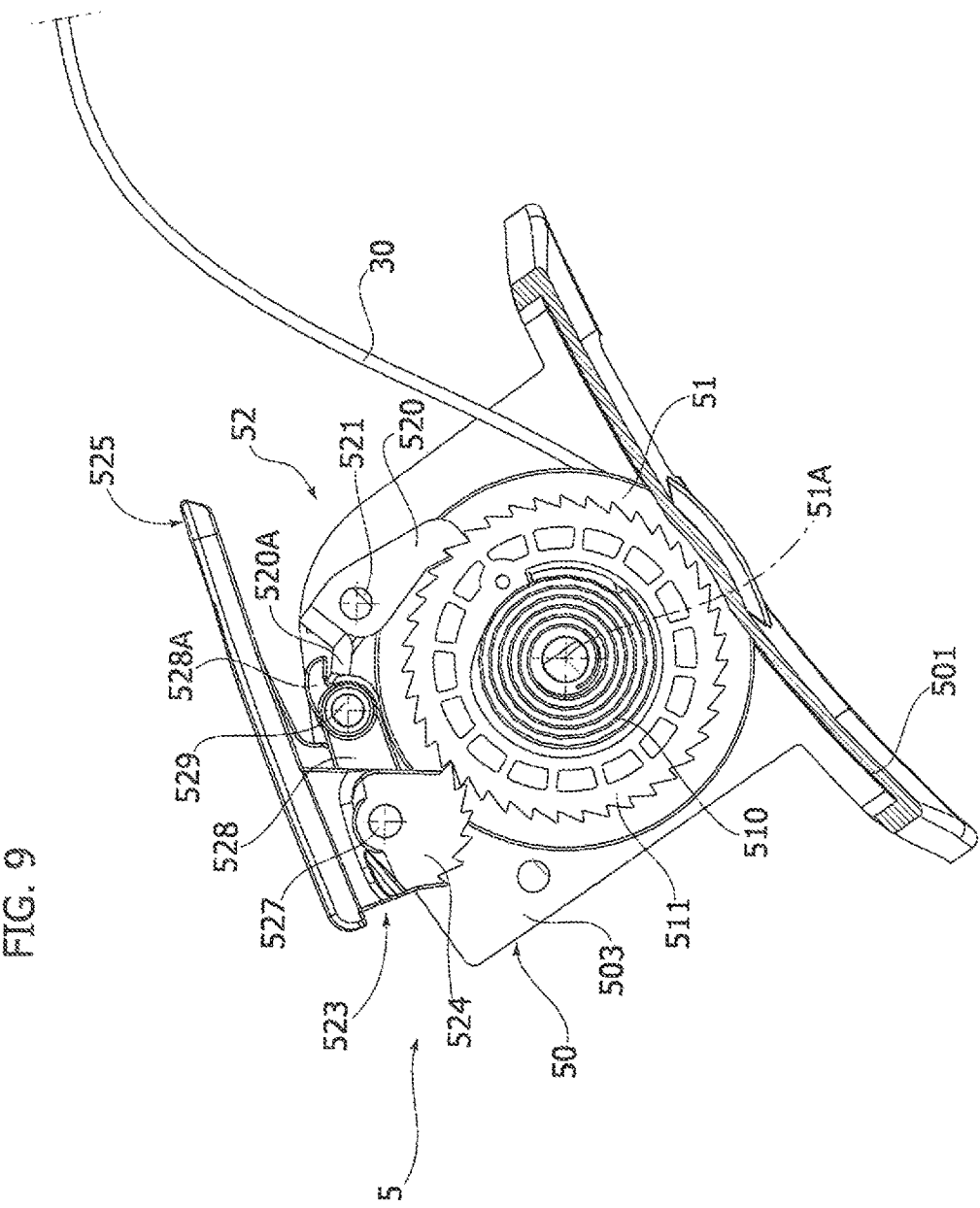
FIGS. 9-11 are views in cross-section and at an enlarged scale of the roll-up device of FIG. 8, which show three different operative conditions of the roll-up device.
Figure 10:
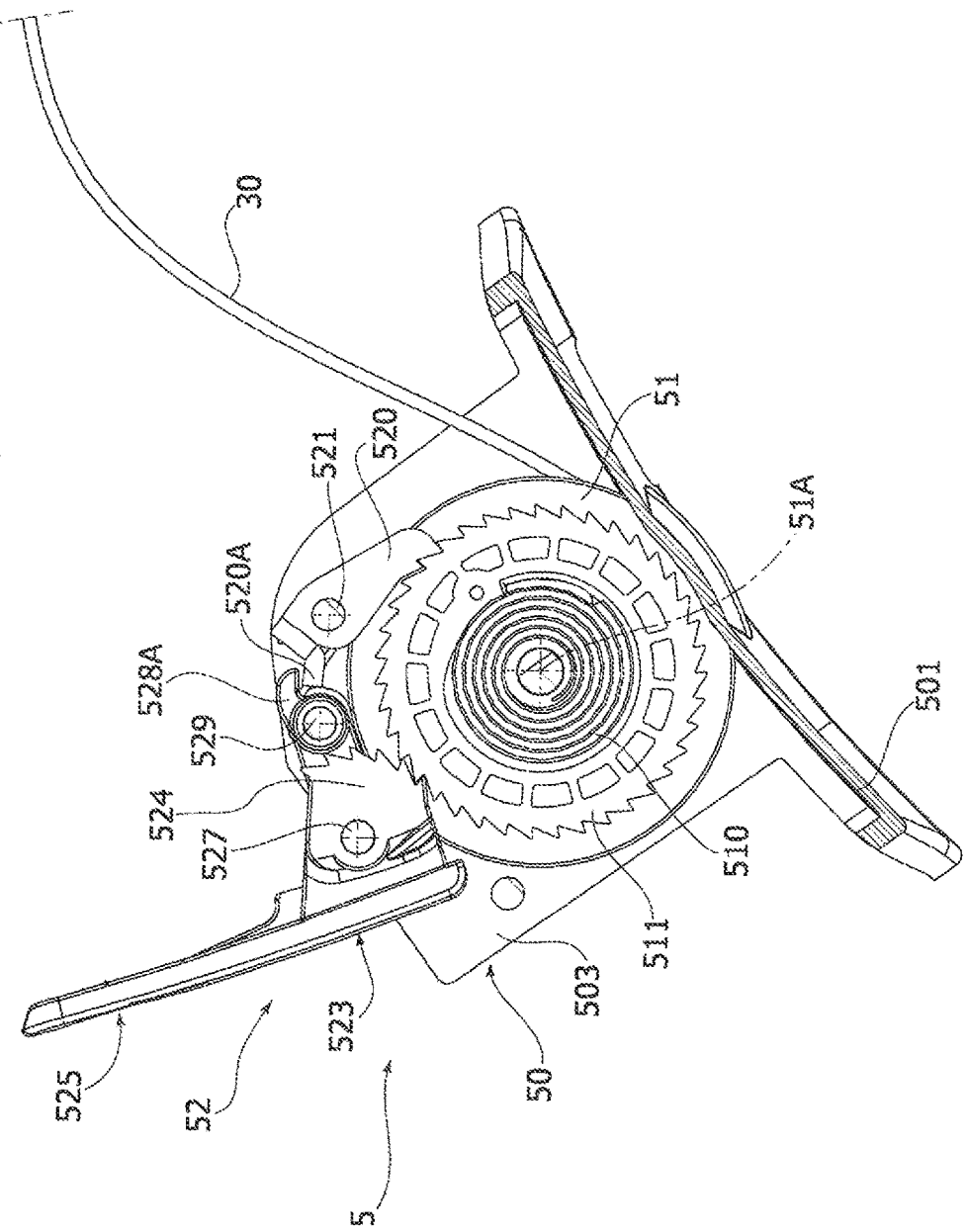
Figure 11:
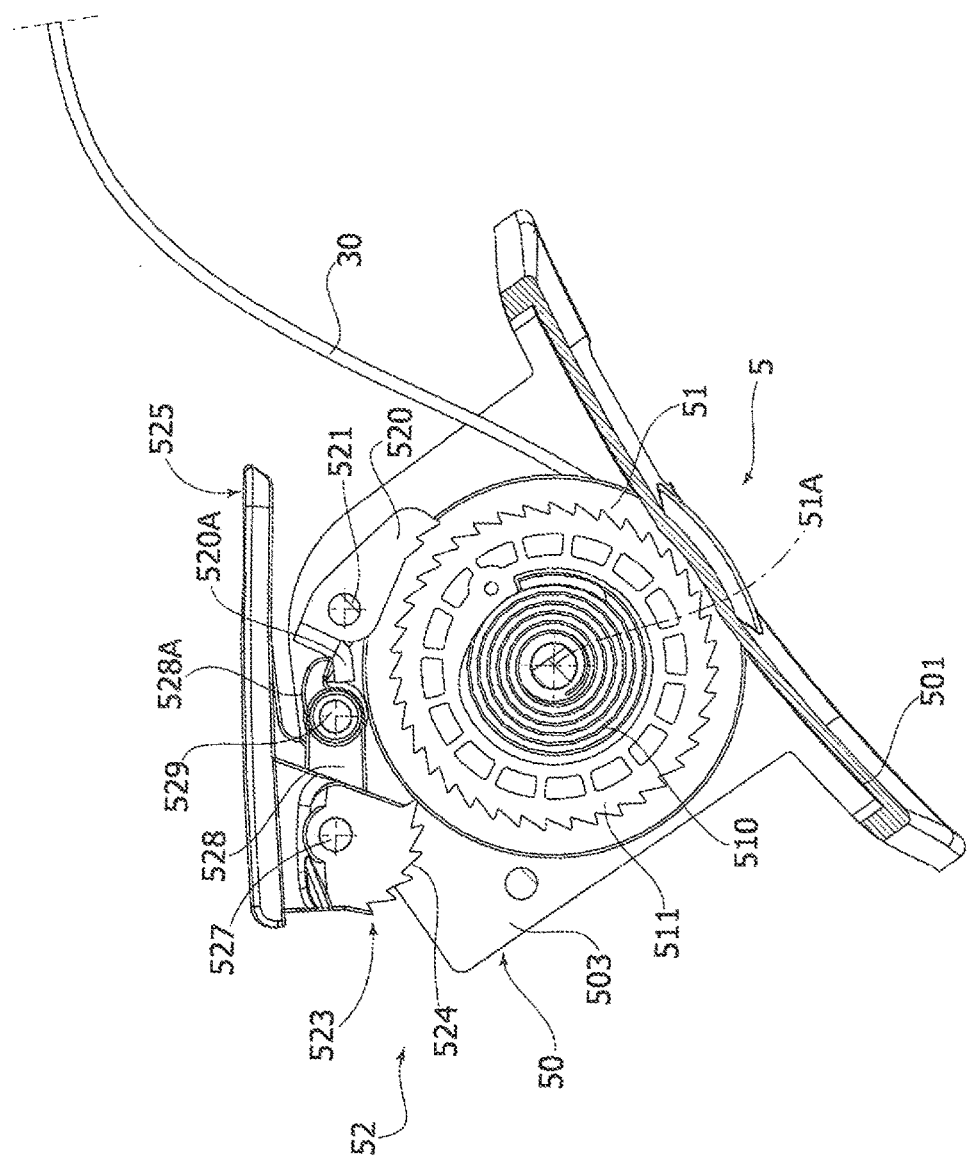

Also with reference to FIG. 8, the two opposite faces of reel 51 carry two toothed crowns 511 (only one of which is visible in FIG. 8) having saw-tooth-shaped teeth, forming part of a ratchet mechanism generally designated by reference numeral 52 in FIGS. 9-11. The ratchet mechanism 52 further comprises, in the case of the illustrated example, a pair of pawls 520 (FIG. 8) carried by a pin 521 whose ends are secured to plates 503 within respective holes 521A. A pin spring 522 is operatively interposed between the assembly of the two pawls 520 and the casing 50 for biasing the two pawls 520 towards a position for engagement of the respective toothed crowns 511, visible in FIG. 9.

In this engagement position, the pawls 520 prevent a rotation of the reel 51 having the toothed crowns 511 in the direction for winding the belt 30.

On the contrary, if the reel 51 rotates in the direction for winding the belt 30, the pawls 520 do not prevent this rotation, but rather repeatedly jump on the toothed crowns 511, due to the elastic bias of spring 522.

The ratchet mechanism 52 further comprises a tensioning member 523 which in the illustrated example comprises a pair of toothed sectors 524 in engagement with the toothed crowns 511. The two toothed sectors 524 are rigidly connected to two parallel and spaced apart plates 526 forming part of the body of an actuating lever 525. The two plates 526 with toothed sectors 524 are pivotally mounted on the ends of a pin 527 (see FIG. 8) which project from the body of a link member 528.

The link member 528 is pivotally mounted on a pin 529 whose ends are secured to plates 503 of the casing 50 within holes 529A. A pin spring 530 is operatively interposed between the link member 528 and the casing 50 for biasing the link member 528 towards a position in which the toothed sectors 529 are in engagement on the respective toothed crowns 511 (see FIG. 9). With reference to FIG. 9, also the teeth of the toothed sectors 524 are saw-tooth-shaped teeth and are arranged so that, in the condition of engagement of sectors 524 on the toothed crowns 511, the sectors 524 prevent a rotation of reel 51 in the direction for unwinding the belt 30.

Also with reference to FIG. 9, the link member 528 has a nose 528A projecting beyond the articulation pin 529 and adapted to cooperate with a cross-member 520A which connects the two pawls 520 to each other, in a way that will be described in the following.

The operation of the above described roll-up device is as follows.

With reference to FIG. 9, when the pawls 520 and the toothed sectors 524 are in their rest condition, they are both in engagement with the respective toothed crowns 511 of the reel 51. If the hook member 301 of the belt 30 is already in engagement on a motor-vehicle part, the belt 30 can be tensioned by winding the belt within the respective roll-up device 51 to the necessary extent. To this end, the actuating lever 525 is repeatedly moved from the rest position shown in FIG. 9 to a first operative position, or tensioning position, which is shown in FIG. 10. Following this rotation, the toothed sectors 524 rotate around the axes of the respective pin 527 causing a rotation of the reel 51 in the winding direction of the belt. This rotation takes place while causing the repeated jumping of pawls 520 on the toothed crowns 511. Once the belt 30 has been tensioned, a stable anchoring of the bicycle-carrying device on the motor-vehicle is obtained.

In this condition, spring 110 would be free to further wind the belt 30, but it is not able to do so, since it is contrasted by the tension of the belt.

With reference to FIG. 11, the actuating lever 525 has a second operative position, or release position, rotated in the opposite direction with respect to the tensioning position (i.e. in a clockwise direction with reference to the figure) starting from the neutral rest position. In this release position, lever 525 causes rotation of the link member 528 around the respective fixed pin 529, with the consequence that nose 528A presses on the cross-member 520A of the pawls 520 thus keeping them disengaged from the toothed crowns 511. In this condition, if the hook member 301 is disengaged from the motor-vehicle, the belt 30 is quickly retracted within the roll-up device, due to the biasing action of spring 510. In this condition, also the toothed sectors 524 are disengaged from the toothed crowns 511, so that they do not prevent the free winding of the belt.

The operative release position of the lever 525 which is shown in FIG. 11, in which the rotation of reel 51 is free, can be exploited also during the mounting stage of the device, since the user can start by engaging the hook members 301 of two legs 3 of device 1 over the motor-vehicle and then he can manually position the bicycle-carrying device on the motor-vehicle while holding the two respective actuating levers 525 pressed in the position shown in FIG. 11. In this manner, the user can cause the free unwinding of belts 30 from the respective roll-up devices, while progressively moving the bicycle-carrying device away from the anchoring points of the hook members 301. When the desired length of belts 30 is reached, the user can release the two actuating levers 525 which thus return to the position shown in FIG. 9, locking the respective roll-up devices. At this moment, the user can engage also the remaining two anchoring belts on the motor-vehicle and finally he can attend to tensioning each of the four anchoring belts 30 by repeated movements of the actuating levers 525 between the position shown in FIG. 9 and the position shown in FIG. 10.

Naturally, while the roll-up device 5 has been illustrated in an example comprising two toothed crowns 511 cooperating with two pawls 520 and two toothed sectors 524, in principle it is possible to provide a single toothed crown cooperating with a single pawl and a single toothed sector.

With reference to FIG. 7, with each roll-up device 5 there is associated a key-operated release-inhibition device, comprising a cylinder lock 83 which controls the movement of a locking member 84 between a rest position and an active position, in which it inhibits a movement of said actuating lever 525 towards the release position. A non-authorized release of the belts is thus prevented, once the bicycle-carrying device has been mounted and locked on the motor-vehicle.

According to a further feature, each belt (made for example of fabric or synthetic material) is reinforced with a plurality of cables made of steel, preferably zinc-plated steel, having an anti-collision and an anti-cut function.

Figure 6:
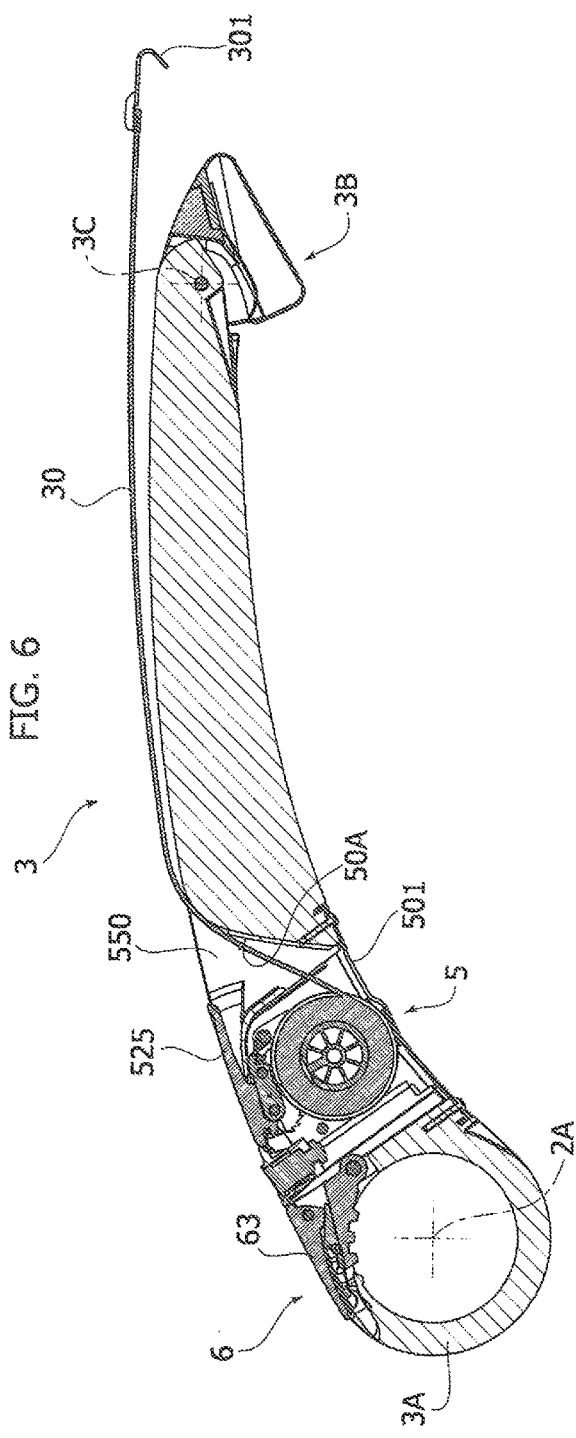
FIG. 6 is a cross-sectional view taken along line VI-VI of FIG. 5.

With reference to FIGS. 6, 6A, the roll-up device has two outlets 550 and 551 located on two opposite faces of the respective leg, which can be used selectively for guiding the belt or cable pulled out from said roll-up device respectively adjacent to one or the other of said opposite faces. In the condition of use shown in FIG. 6A, in which the belt is adjacent to the lower face of the leg (with reference to the figure), the belt is arranged between two portions 3B1 of the foot 3B, so that once the respective hook 301 is engaged on the motor-vehicle, the belt 30 opposes any movements of the leg 3 along a direction transverse to the median vertical plane of the vehicle.

Figure 12:
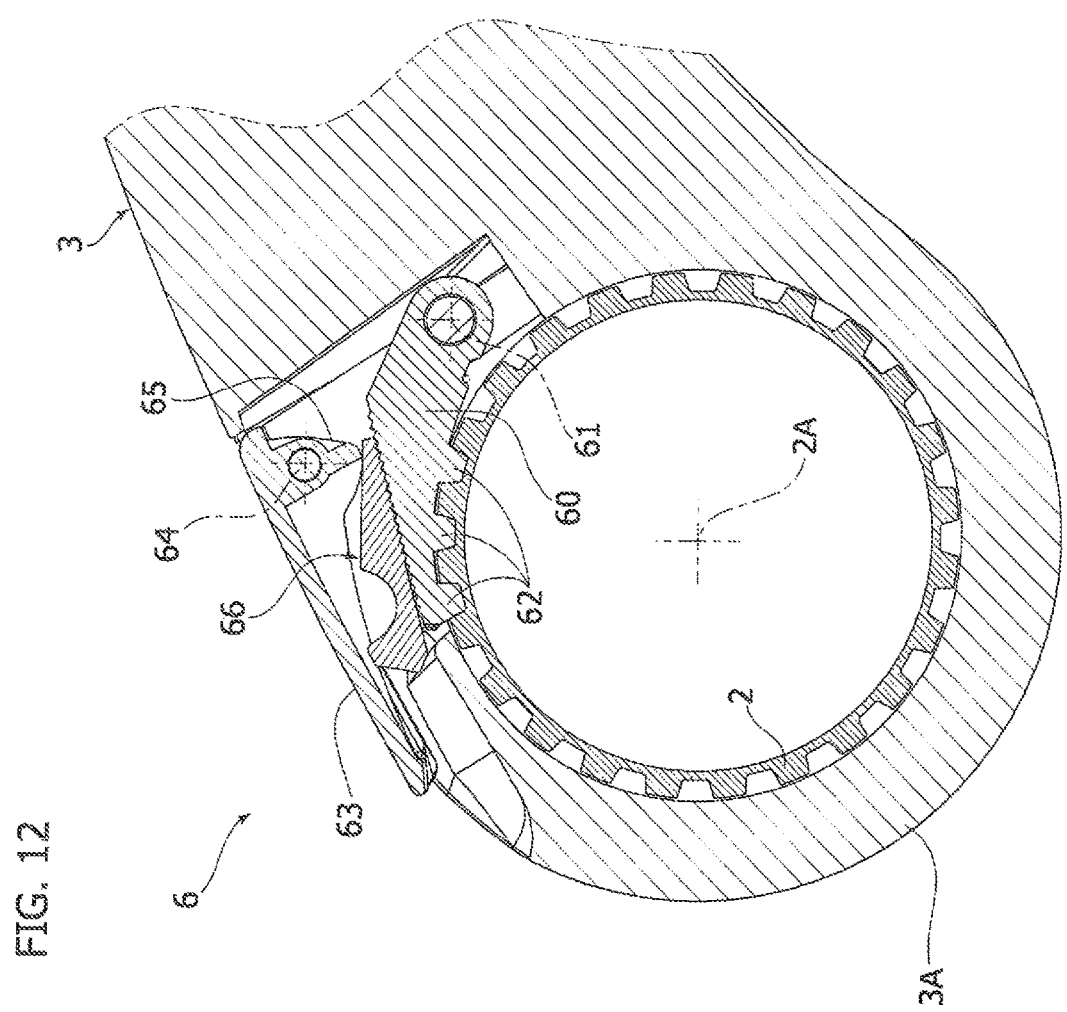
FIGS. 12-14 show a clamping device forming part of the bicycle-carrying device according to the invention, at an enlarged scale, in three different operative conditions.
Figure 13:
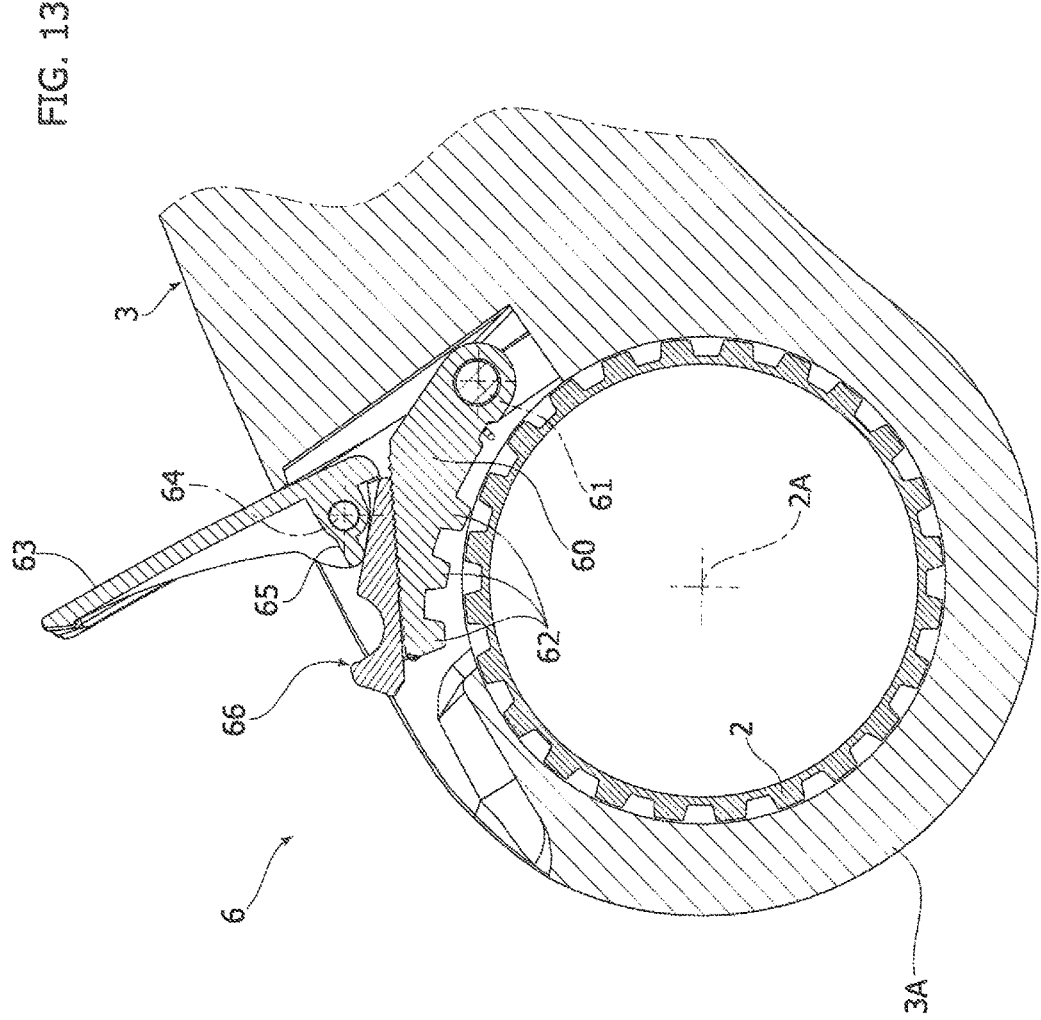
Figure 14:
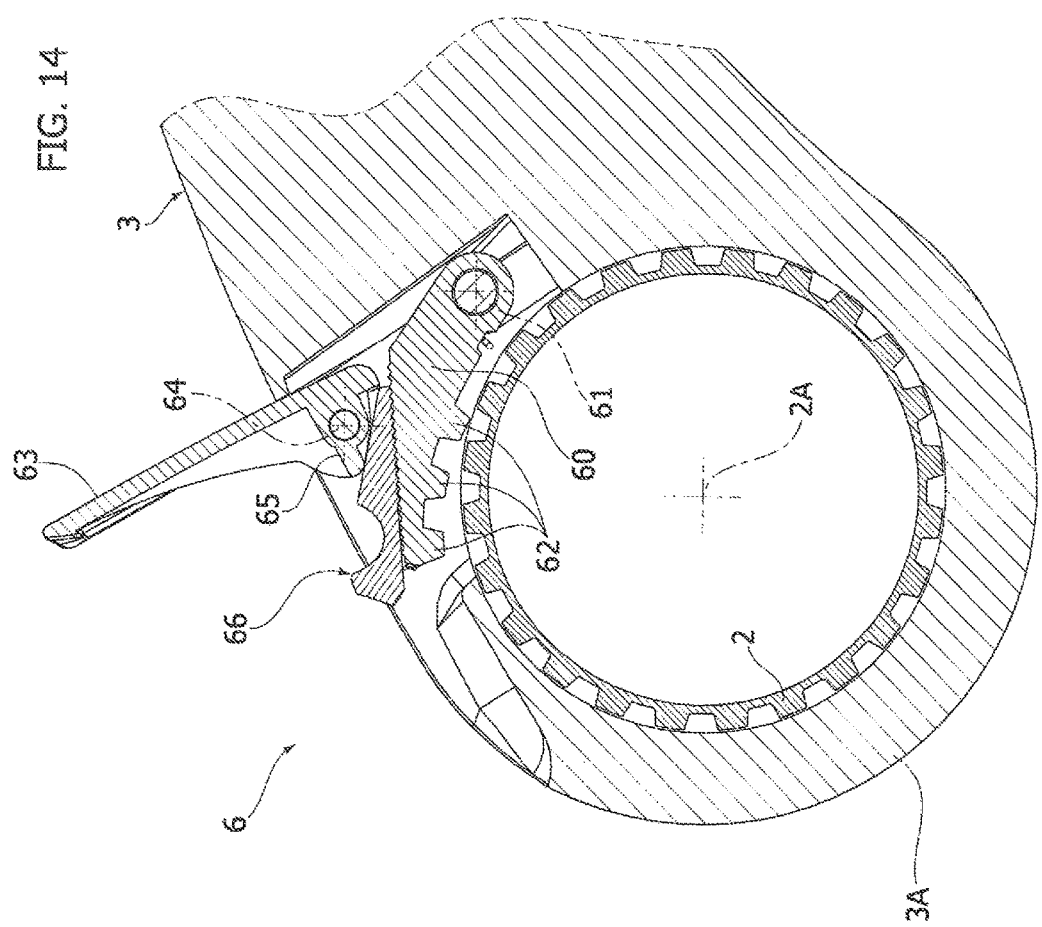

FIGS. 12-14 show the clamping device which is preferably associated with hubs 3A,4C of each leg 3 and each arm 4, for clamping each hub on the fluted shaft 2. The figures refer in particular to the case of a leg 3. In this figures, the clamping device associated with each hub 3A comprises a jaw 60 pivotally mounted around an axis 61 on the body of leg 3 and having teeth 62 for engagement on the outer fluted surface of the transverse shaft 2. The clamping device 6 further comprises a locking lever 63 pivotally mounted around an axis 64 on the body of leg 3 and carrying (in the case of the illustrated example, in one piece with lever 63) a cam member 65 for pressing jaw 60 against shaft 2. The locking lever 63 is movable between a release position, visible in FIG. 13, and a locking position, visible in FIG. 12, in which the cam member 65 has passed a dead centre position, which prevents an undesired return of the locking lever 63 to the release position. Also with reference to FIGS. 12-14, between the cooperating surfaces of the cam member 65 and locking jaw 60 there is interposed an intermediate wedge-like member 66.

As shown in FIG. 14, in the release position of lever 63, the intermediate wedge-like member 63 can be advanced or retracted in its position interposed between said elements, to enable an adjustment of the clamping force. In order to obtain a precise reference of the mounting position of the wedge-like intermediate member 66, the surfaces of member 66 and locking jaw 60 which are in contact with each other have parallel micro indentations.

Although the example illustrated herein makes use of a fluted shaft 2 and the jaw 60 has teeth cooperating with the fluted surface of the shaft, it is not excluded that the shaft has a non-fluted surface, such as a surface having a high friction coefficient cooperating with a jaw surface which also is made with a high friction coefficient.

With reference to FIG. 15, at least one of the arms 4 carries inside therein a metal cable 7, which can be pulled out from the arm, having an anti-theft function, this cable having a free end with a fork-like shape 70. Cable 7 can be arranged around a frame element of a bicycle carried on the bicycle-carrying device, after which the fork-shaped end 70 can be received within a seat 71 formed in the free end of arm 4 and locked therein by means of a locking member 72 controlled by a rotatable cylinder of a cylinder lock 73, operable by a key.

The bicycle-carrying device according to the invention is further provided with members for opposing an oscillation (anti-sway members) of the transported bicycles, which are constituted by supports 8 associated with the arms 4 (see FIGS. 1 and 4) and provided with respective clamping belts. According to a preferred feature of the invention, each anti-sway member is adjustable in position due to a threaded coupling.

Naturally, while the principle of the invention remains the same, the details of construction and the embodiments may widely vary with respect to what has been described and illustrated purely by way of example, without departing from the scope of the present invention.

The invention claimed is:

1. Bicycle-carrying device for motor-vehicles, comprising:
   a support structure, defining a main axis,
   a plurality of legs carried by the support structure for abutment on the rear part of a motor-vehicle, at least some of said legs having a hub being orientable around said main axis,
   a plurality of arms carried by the support structure, for supporting one or more bicycles,
   a plurality of belts or cables associated with the bicycle-carrying device and each having a hook member to be engaged on a motor-vehicle part, for anchoring said bicycle-carrying device to the motor-vehicle,
   one or more roll-up devices for winding said belts or cables around respective winding axes, wherein each roll-up device is in the form of a subassembly comprising a casing, a reel onto which one of the belts or cables are wound and rotatably mounted to the casing, and an actuator mechanism carried by the easing and operable on the reel for providing selective extension and retraction of the belt or cable, wherein the actuator mechanism includes an actuator member,
   wherein at least some of said legs have an inner cavity spaced from the hub and extending inwardly into the leg from an opening in an outer surface defined by the leg, wherein the roll-up devices are separate from the legs, and wherein the respective roll-up devices are each arranged within the inner cavity of the respective leg by securing the casing of the roll-up device to the leg such that the roll-up device is positioned within the inner cavity inwardly of the outer surface of the leg, wherein the actuator member of the actuator mechanism is accessible via the opening in the outer surface defined by the leg, wherein each roll-up device has a winding axis located at a position spaced apart from said main axis.

2. The bicycle-carrying device according to claim 1, wherein all said legs have respective roll-up devices each arranged within an inner cavity of the leg inwardly of the outer surface of the leg, with the winding axis located at a position spaced apart from said main axis.

3. The bicycle-carrying device according to claim 1, wherein said support structure comprises a shaft whose axis defines said main axis and said legs and arms each have a hub mounted on a respective portion of said shaft.

4. The bicycle-carrying device according to claim 3, wherein the hub of at least some of said legs and said arms is provided with a clamping device for clamping the hub in a selected mounted position over a portion of said shaft.

5. The bicycle-carrying device according to claim 4, wherein said clamping device comprises:
   a jaw pivotally mounted on the hub of the respective arm or leg, for engagement of a portion of said shaft, a locking lever pivotally mounted on the respective arm or leg and carrying a cam member for pressing said jaw against said shaft, said locking lever being movable from a release position to a final locking position located beyond a dead centre position, so as to prevent an undesired return of the locking lever to the release position, a wedge-like intermediate member, interposed between cooperating surfaces of said cam member and said jaw and adjustable in position, for adjusting the clamping force of said jaw.

6. The bicycle-carrying device according to claim 1, wherein each roll-up device has an outlet for the respective belt or cable which is arranged so that when the belt or cable is pulled out from the roll-up device it extends in line with the respective leg, substantially along a same plane as said leg orthogonal to said main axis.

7. The bicycle-carrying device according to claim 1, wherein each leg is provided with a foot for abutment on the motor-vehicle, said foot having two foot portions which are spaced apart from each other along a transverse direction, so that in the mounted condition of said bicycle-carrying device on the motor-vehicle the foot of each leg can be arranged with its two portions on the two sides of a hook member carried by the belt or cable associated with said leg, so that once engaged on the motor-vehicle, said hook member prevents movements of the foot along a transverse direction.

8. The bicycle-carrying device according to claim 1, wherein each roll-up device is provided with a device for quick retraction of the belt or cable.

9. The bicycle-carrying device according to claim 1, wherein each roll-up device further comprises:

at least one spring operatively interposed between the casing and the reel for biasing the reel in a direction for winding said belt or cable, and a ratchet mechanism, including:
at least one toothed crown associated with said reel,
a pawl pivotally mounted on said casing and elastically biased into engagement with said at least one toothed crown, so as to prevent a rotation of the toothed crown in the direction for unwinding said belt or cable, while leaving the toothed crown free of rotating in the opposite direction,
a, toothed sector associated with the actuator member and engaging said at least one toothed crown, wherein said actuator member is pivotally mounted on said casing,
said actuator member being movable from a rest position to a first operative position or tensioning position, for rotating said toothed crown in the winding direction and causing a tensioning of said belt or cable after the respective hook member has been engaged on the motor-vehicle,
said actuator member being also movable from the rest position to a second operative position or release position, located on the opposite side with respect to said first operative position, for causing disengagement of both said toothed sector and said pawl from said toothed crown.

10. The bicycle-carrying device according to claim 9, wherein each roll-up device includes a key-operated release-inhibition device, for inhibiting a movement of said actuator member to the release position.

11. The bicycle-carrying device according to claim 1, wherein the belts or cables comprise anchoring belts which are each armoured with a plurality of steel cables.

12. The bicycle-carrying device according to claim 1, wherein said cavity extends between and opens onto each of a pair of oppositely facing outer surfaces of the leg.

13. Bicycle-carrying device for motor-vehicles, comprising:

a support structure, defining a main axis, a plurality of legs carried by the support structure for abutment on the rear part of a motor-vehicle, at least some of said legs having a hub being orientable around a main axis, a plurality of arms carried by the support structure, for supporting one or more bicycles, a plurality of belts or cables associated with the bicycle-carrying device and each having a hook member to be engaged on a motor-vehicle part, for anchoring said bicycle-carrying device to the motor-vehicle, in which said bicycle-carrying device comprises one or more roll-up devices for winding said belts or cables around respective winding axes, wherein at least some of said legs have an inner cavity spaced from the hub and extending inwardly into the leg from an outer surface defined by the leg, and respective roll-up devices each arranged within the inner cavity of the respective leg and positioned inwardly of the outer surface of the leg, wherein each roll-up device has a winding axis located at a position spaced apart from said main axis, and wherein each roll-up device has two outlets for the belt or cable of the roll-up device located on two opposite faces of the respective leg, wherein the roll-up device outlets are configured to selectively guide the belt or cable of the roll-up device out from said roll-up device respectively adjacent to one or the other of said opposite faces, wherein the two outlets are arranged so that when the belt or cable of the roll-up device is pulled out from the roll-up device it extends in line with the respective leg, substantially along a same plane as said leg orthogonal to said main axis.

14. The bicycle-carrying device according to claim 13, wherein each leg is provided with a foot for abutment on the motor-vehicle, said foot having two foot portions which are spaced apart from each other along a transverse direction, so that in the mounted condition of said bicycle-carrying device on the motor-vehicle the foot of each leg can be arranged with its two portions on the two sides of a hook member carried by the belt or cable associated with said leg, so that once engaged on the motor-vehicle, said hook member prevents movements of the foot along a transverse direction.

15. Bicycle-carrying device for motor-vehicles, comprising:

a support structure, defining a main axis, a plurality of legs carried by the support structure for abutment on the rear part of a motor-vehicle, at least some of said legs having a hub being orientable around a main axis, a plurality of arms carried by the support structure, for supporting one or more bicycles, a plurality of belts or cables associated with the bicycle-carrying device and each having a hook member to be engaged on a motor-vehicle part, for anchoring said bicycle-carrying device to the motor-vehicle, in which said bicycle-carrying device comprises one or more roll-up devices for winding said belts or cables around respective winding axes, wherein at least some of said legs have an inner cavity spaced from the hub and extending inwardly into the leg from an outer surface defined by the leg, wherein said cavity extends between and opens onto each of a pair of oppositely facing outer surfaces of the leg and wherein respective roll-up devices are each arranged within the inner cavity of the respective leg and positioned inwardly of the outer surface of the leg, wherein each roll-up device has a winding axis located at a position spaced apart from said main axis, wherein the roll-up device positioned within said cavity has two outlets for the belt or cable of the roll-up device, each of which is located adjacent one of the pair of oppositely facing outer surfaces of the leg, wherein the two outlets of the roll-up device are configured for guiding the belt or cable of the roll-up device out from said roll-up device adjacent to one or the other of said oppositely facing outer surfaces.

16. The bicycle-carrying device according to claim 15, wherein each leg is provided with a foot for abutment on the motor-vehicle, said foot having two foot portions which are spaced apart from each other along a transverse direction, so that in the mounted condition of said bicycle-carrying device on the motor-vehicle the foot of each leg can be arranged with its two portions on the two sides of a hook member carried by the belt or cable associated with said leg, so that once engaged on the motor-vehicle, said hook member prevents movements of the foot along a transverse direction.

* * * * *

UNITED STATES PATENT AND TRADEMARK OFFICE
CERTIFICATE OF CORRECTION

PATENT NO. : 10,053,022 B2
APPLICATION NO. : 14/921172
DATED : August 21, 2018
INVENTOR(S) : Fabio Pedrini Page 1 of 1

It is certified that error appears in the above-identified patent and that said Letters Patent is hereby corrected as shown below:

In the Claims

Claim 1, Column 8, Line 33, delete "easing" and substitute therefor -- casing --;

Claim 9, Column 9, Line 44, after "a" delete ",";

Claim 15, Column 11, Line 2, after "leg" insert -- , --.

Signed and Sealed this
Twenty-third Day of October, 2018

Andrei Iancu
*Director of the United States Patent and Trademark Office*